ate of Patent: * May 28, 1985

United States Patent [19]
Rialland et al.

[11] Patent Number: 4,520,036
[45] Date of Patent: * May 28, 1985

[54] PROCESS FOR TREATING MILK WITH A CATION-EXCHANGE RESIN FOR THE PREPARATION OF DECATIONIZED, ACIDIFIED MILK

[75] Inventors: Jean P. Rialland, Retiers; Jean P. Barbier, Noyal sur Seiche, both of France

[73] Assignee: Laiteries E. Bridel, Retiers, France

[ * ] Notice: The portion of the term of this patent subsequent to Oct. 5, 1999 has been disclaimed.

[21] Appl. No.: 509,035

[22] Filed: Jun. 29, 1983

[30] Foreign Application Priority Data

Jul. 9, 1982 [FR] France .................. 82 12126

[51] Int. Cl.³ ............................. A23C 9/146
[52] U.S. Cl. .................... 426/271; 426/491
[58] Field of Search ............. 426/580, 583, 491, 271, 426/587; 210/681, 687

[56] References Cited

U.S. PATENT DOCUMENTS 4,352,828 10/1982 Rialland et al. .................. 426/271
4,423,081 12/1983 Salmon .......................... 426/580

FOREIGN PATENT DOCUMENTS 0038732 10/1981 European Pat. Off. .
2345939 10/1977 France .
288707 2/1953 Switzerland .

Primary Examiner—Raymond Jones
Assistant Examiner—Marianne S. Minnick
Attorney, Agent, or Firm—Bacon & Thomas

[57] ABSTRACT

A process for the preparation of decationized, acidified milk having a pH less than or equal to 3.8 wherein milk is contacted with a cation-exchange resin in the acid form at a temperature above 4° C., preferably 8° to 20° C., and in the presence of an excess of milk previously acidified at a pH equal to or less than 3.8, preferably between 2.2 and 2.8, and in which the quantity of ordinary milk introduced is such that the pH of the mixture of acidified and ordinary milk is maintained at a value equal to or less than 3.8, preferably between 2.2 and 2.8.

15 Claims, 1 Drawing Figure

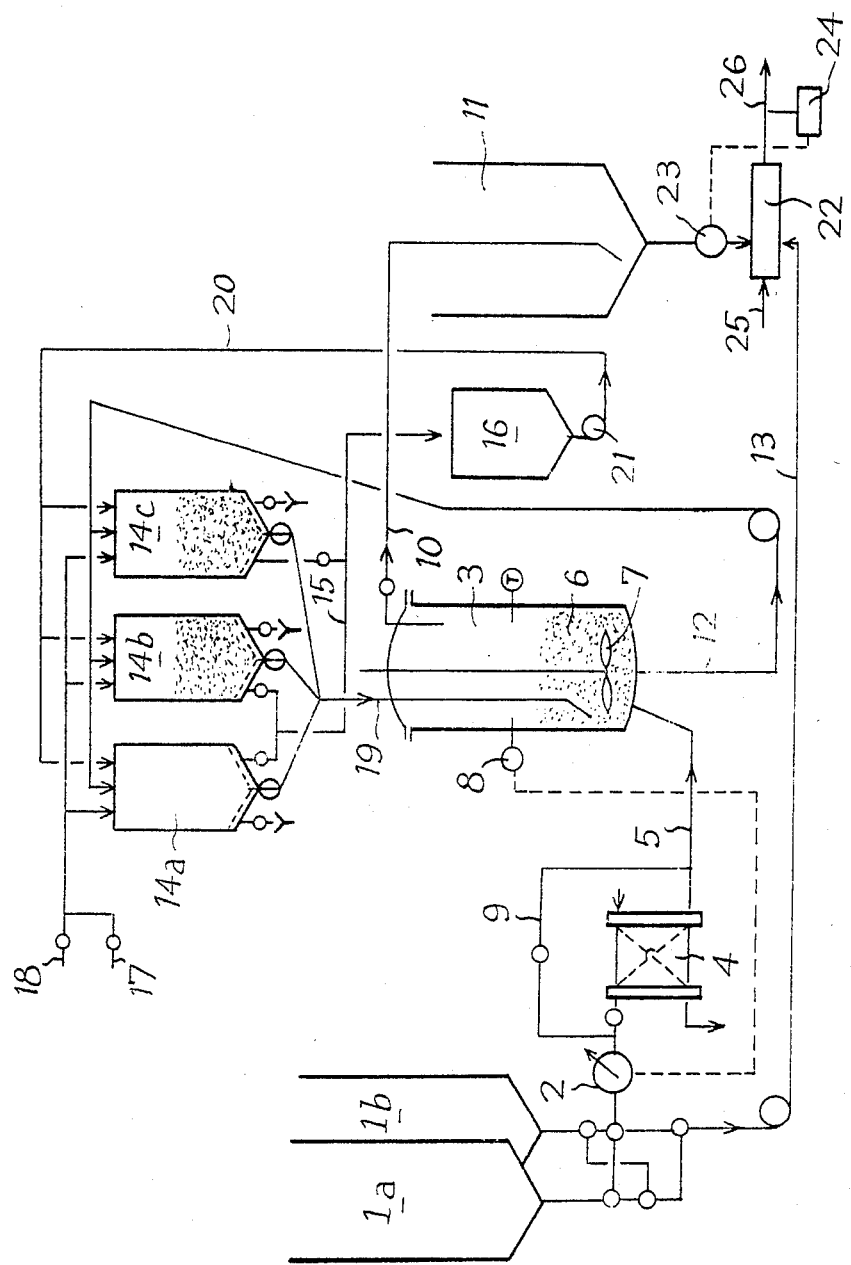

PROCESS FOR TREATING MILK WITH A CATION-EXCHANGE RESIN FOR THE PREPARATION OF DECATIONIZED, ACIDIFIED MILK

U.S. Pat. No. 4,352,828, filed Apr. 7, 1981, relates to a decationised, acidified milk having a pH less than or equal to 3.8, a content of proteinaceous materials and a lactose content the same as that of ordinary milk, a very low content of mineral elements, less than 4 g/l, and a Ca/P ratio less than 0.5.

It also concerns a process for the preparation of such decationised, acidified milk, comprising contacting the milk with a cation-exchange resin in the acid form, at a temperature of 0° to 4° C., preferably 0° to 2° C., for a time necessary to reduce the pH of the milk to a value less than or equal to 3.8, followed by the separation of the decationised, acidified milk thus formed from the cation-exchange resin.

This process was based on the discovery of two specific novel properties of milk treated by cation-exchange:

1—when the milk is treated by contact with a cation-exchange resin in the acid form, a lowering of the pH of the milk is observed and, if the milk is maintained at a temperature in the range of 0° to 4° C., coagulation of the casein contained in the milk is inhibited, irrespective of the pH and, more particularly, at all pH values equal to or less than the isoelectric point of the casein in the milk (pH<4.6), although, in the given pH range, coagulation of the casein of the milk takes place when its temperature exceeds 4° C.;

2—when the milk is treated by contact with a cation-exchange resin in the acid form and the pH of the milk is equal to or less than 3.8, coagulation of the casein contained in the milk is inhibited at temperatures above 4° C., although in this temperature range, coagulation of the milk casein occurs when the pH exceeds the 3.8 value.

The process described allows, while maintaining the temperature of the milk, during its contact with the cation-exchange resin in the acid form, in the range 0°-4° C., reduction of the pH of the milk to a value equal or less than the isoelectric point of the casein, without causing coagulation of the casein, and, while reducing the pH of the treated milk to a value equal to or less than 3.8, maintenance of the milk at a temperature above 4° C., for example at ambient temperature, without coagulation of the casein.

It has now been discovered that it is possible to produce decationised, acidified milk, by contacting the milk with a cation-exchange resin in the acid form, and that, without it being necessary to maintain the milk and the exchange resin in the low temperature range of 0° to 4° C. during the whole duration of treatment, appreciable ecomonies in large calories can be achieved.

The present invention has as its object an improvement of the process described in the said U.S. Patent, to allow the best expression of the described process.

The process according to the present invention comprises contacting milk with a cation-exchange resin in the acid form, the conditions of contact being at a temperature greater than 4° C., preferably 8° to 20° C., and in the presence of an excess of milk previously acidified at a pH equal to or less than 3.8, preferably between 2.2 and 2.8, in which ordinary milk is introduced at a rate such that the pH of the mixture of acidified and ordinary milk in contact with the exchange resin is maintained at a value equal to or less than 3.8, preferably between 2.2 and 2.8.

More particularly, the present invention has as its object a semi-continuous process for the production of decationised, acidified milk, the process comprising (a) the preparation of a, decationised and acidified milk stock at a pH less than 3.8, preferably between 2.2 and 2.8, by contacting the milk with a cation-exchange resin in the acid form, at a temperature of 0° to 4° C., preferably 0° to 2° C., for the time necessary to reduce the pH of the milk to the desired value, followed by the separation of the spent exchange resin from the acidified milk stock obtained;

(b) the addition of cation-exchange resin in the acid form, fresh or regenerated, to the milk stock;

(c) the continuous introduction of ordinary milk at a temperature above 4° C., preferably 8° to 20° C., while contacting the milk with the exchange resin in the presence of the acidified milk stock;

(d) the continuous drawing off of the acidified milk in proportion to its rate of formation, in which the rates of introduction of the ordinary milk and the drawing off of the acidified milk are regulated in a manner such that the pH of the mixture of acidified and ordinary milk is maintained constant at a value equal to or less than 3.8, preferably between 2.2 and 2.8.

In the step of preparing the milk stock, a duration of contact of the milk with the exchange resin of 1 to 10 min. is, in general, sufficient for the desired pH to be obtained; this duration of contact is advantageously reduced to 1-5 min. if the milk is maintained in the resin under agitation; the volumetric ratio of the treated milk to the exchange resin is preferably from 2:1 to 4:1.

In the step of contacting the fresh milk with the exchange resin in the presence of the milk stock, the total duration of the contact is 20 to 60 min., preferably 30 min.; the volumetric ratio of the fresh milk to the exchange resin is 5 to 15, preferably 10.

By way of non-limitative example, the process according to the invention may be conducted by the following procedure:

(a) 3 parts by volume of skimmed milk cooled to between 0° and 4° C. are contacted, in a reactor, with one part per volume of the exchange resin, for a time sufficient to reach a pH equal to or less than 3.8 and preferably between 2.2 and 2.8; the necessary time for this acidification is in general less than 10 min. The spent resin is separated from the acidified milk, and is then subjected to conventional procedures for rinsing and regeneration of the resin with an acid solution (b) The acidified milk is re-introduced into the reactor and contacted with one part by volume of the fresh or regenerated exchange resin.

(c) Fresh skimmed milk, at a temperature above 4° C., preferably between 8° C. (milk conservation temperature) and 20° C. (ambient temperature) is continuously fed into the reactor. The milk in contact with the exchange resin becomes acidified; the acidified milk is regularly drawn off from the reactor, at the same rate as the milk introduced. The rate is regulated in a manner such that the pH of the mixture of milks is maintained at a value equal to or less than 3.8, and preferably between 2.2 and 2.8. The quantity of fresh milk thus treated is generally between 5 and 15 times the volume of resin.

The preferred pH range of 2.2 to 2.8 of the acidified milk is chosen in order to limit the duration of treatment to an industrially-acceptable value (for reducing the milk pH to 2.2, the duration of contact of the milk with the exchange resin is about 1 h; for a reduction of this pH to 2.8, the duration is about ½ h), and in order to limit the volume of acidified milk stock to be used as the acidifying agent (it is necessary to use 90 ml of milk at pH 2.2 and 130 ml of milk at pH 2.8, for bringing the pH of 100 ml of ordinary milk to the isoelectric point).

Suitable exchange resins are conventional cation-exchange resins in the acid form, as used in conventional demineralisation, and including those used for the demineralisation of whey. In particular, strongly acid cation-exchange resins may be used, having a polystyrene skeleton carrying sulphonic acid groups, in the form of gels or macroporous solids (e.g. spheres or rodlets). Macroporous resins are preferred to gel resins, on account of their higher mechanical resistance.

Strongly acid cation resins having a polystyrene backbone with sulphonic acid groups are commercially available under the following marks:
"Duolite" (Diaprosim-Diamond),
"Amberlite" (Rohm and Haas),
"Lewatit" (Bayer),
"Kastel" (Montedison),
"Dowex" (Dow Chemical),
"Relite" (Residion) and
"Zerolit" (Permutit).

The following strongly acidic cationic resins of macroporous structure are preferred:
"Duolite C 26" (styrene-divinylbenzene copolymer with sulphonic acid groups; spheres of granulometry 0.3 to 1.2 mm; apparent density 0.85 kg/l),
"Amberlite 200" and "Amberlite 252" (styrenedivinylbenzene copolymer with sulphonic acid groups; apparent density 0.80 kg/l; granulometry 0.4–0.5 mm),
"Lewatit SP 112" (polystyrene with sulphonic acid groups; spheres of granulometry 0.3–1.5 mm; apparent density 0.70–0.80 kg/l),
"Kastel C 300 P" and "Kastel 300 AGRP" (styrenedivinylbenzene copolymer with sulphonic acid groups; spheres of granulometry 0.3–1.2 mm; apparent density 0.84–0.86 kg/l) and
"Dowex MSC-1" (sulfonated styrene divinylbenzene copolymer; spheres of granulometry 0.29–0.84 mm; apparent density 0.80 kg/l).

The treatment of the milk with the cation-exchange resin is conducted by techniques known per se, for example using mechanical or pneumatic agitation of the milk-cation-exchange resin mixture.

After saturation of the cation-exchange resin with the milk cations, the exchange resin is then regenerated with an acid. After washing the thus-regenerated exchange resin with decationised water, the regenerated exchange resin is ready for use in a new cycle of treatment.

The decationised, acidified milk obtained according to the invention can be used for the acidification of normal skimmed milk, for the preparation of acidified milk, of casein, of acid curd for cheese without rennet, and of milk serum.

For the preparation of acidified milk, the decationised, acidified milk, is mixed with normal milk, until the desired pH is obtained.

For the preparation of milk casein and of milk serum, the decationised, acidified milk is mixed with a quantity of untreated, normal milk, sufficient to raise the pH of the mixture to the region of the isoelectric point of the milk casein, followed by heating of the mixture thus obtained to a temperature of 10° to 60° C., to coagulate the casein content both in the treated and untreated milk, and the recovery of the thus-coagulated casein and the milk serum thus obtained. More specifically, the decationised, acidified milk is mixed with a certain volume of untreated, normal milk (preferably a volume equal to that of the decationised milk), in order to raise the pH of the mixture to 4.4–4.6, and the mixture thus obtained is heated to a temperature of 40° to 50° C., in order to cause the coagulation of the casein contained in that mixture. The coagulated casein is separated from the milk serum, then washed and dried by conventional procedures (drying by atomisation or by warm air on a fluidised bed) or transformed into alkali metal or alkaline earth metal (sodium, potassium, calcium) caseinates or ammonium caseinate. The milk serum recovered (which does not contain the cations supplied by the untreated milk) can then be dried as such, after neutralisation, or after having been subjected to conventional technological treatments such as demineralisation, ultrafiltration or concentration by reverse osmosis.

Alternatively, in using the decationised, acidified milk for the preparation of acid curd for cheese, without rennet, especially "cottage cheese", the decationised, acidified milk is mixed with untreated normal milk in a quantity sufficient to increase the pH of the mixture to the region of the isoelectric point of the casein of the milk; the mixture thus obtained is heated to a temperature of 10°–60° C., to coagulate the casein contained therein in the form of curd, both in the decationised, acidified milk and in the normal, untreated milk; and cutting the curd thus formed, heating at a temperature between 48° and 60° C., drawing off the milk serum which is recovered, washing the curd with cold water, and thoroughly dewatering. More specifically, the decationised, acidified milk is mixed with normal, untreated milk previously cooled to a temperature of 0° to 4° C., in a quantity sufficient (preferably a volume equal to that of the decationised milk) to raise the pH of the mixture to a value of 4.4–4.8, preferably 4.4–4.6, and the mixture is then heated at a temperature of 30° to 35° C., to coagulate the curd.

Further, by the processes described below, the cheese types known as "cottage cheese", "queso blanco", "quark", "cheddar-like cheese", "ricotta", "blue cheese" and pizza cheese can be prepared.

The invention is illustrated in the following description by reference to the accompanying drawing in which the only figure shows apparatus, schematically, for carrying out an embodiment of the process according to the invention.

With reference to the drawing, skimmed milk is stored in vats 1a and 1b. In one of these vats, a predetermined volume of milk is transferred by means of a pump 2 into a closed reactor 3, after cooling to a temperature of 0° to 4° C. in a heat exchanger 4. The transfer of the milk is via a conduit 5. In the reactor 3, the cooled milk is contacted with a cationic resin 6 in the H+ form. The intimate contact between the resin and the milk is sufficiently achieved by agitation, by means of a stirrer 7, to maintain the resin in suspension in the milk.

When the pH value of the treated milk, as recorded by a pH meter 8 is equal to or less than 3.8, fresh skimmed milk is continuously introduced into the reactor 3 via a conduit 9 (without passing through the thermal exchanger 4) while the decationised, acidified milk formed is drawn off from the reactor at the same rate through a conduit 10 and transferred to a storage vat 11.

The introduction is regulated by action of the pH meter 8 on the pump 2. At the end of the first cycle of treatment, the residual volume of acidified milk and saturated cationic resin in the reactor 3 is transferred via a conduit 12, using a pump 13, into one of the regenerators 14a, 14b and 14c. The cationic resin is retained by the perforated floor of one of these regenerators (14b for example) while the residual acidified milk circulates freely via a conduit 15 into a buffer tank 16.

In the regenerator, after washing, the saturated resin is regenerated with dilute aqueous hydrochloric acid introduced via conduits 17 (water) and 18 (HCl).

The regenerated cationic resin in one of the regenerators (14a for example) is transferred into the reactor 3 via a conduit 19 at the same time as the acidified milk stored in the buffer tank 16 is returned into the same regenerator via a conduit 20, using a pump 21. After transfer, fresh skimmed milk from the vat 1a or 1b is continuously transferred, without passing through the heat exchanger 4, directly via conduit 9 into the reactor 3. The decationised, acidified milk formed in the reactor is continuously drawn off through the conduit 10 and stored in the tank 11. The rates of introduction of the fresh milk and the drawing-off of the decationised, acidified milk are regulated by the pH meter 8 acting on the pump 2, in a manner such that the pH of the milk in the reactor 3 is equal to or less than 3.8.

After the resin is saturated, the second cycle is stopped, and the residual volume of decationised, acidified milk and saturated resin in the reactor 3 is transferred into the now free regenerator 14a. The residual acidified milk is recovered as before in the buffer tank 16 and the resin is washed and then regenerated by dilute aqueous hydrochloric acid.

A new cycle may then be operated by transfer into the reactor 3 of the regenerated resin in the regenerator 14c and the residual acidified acid stored in the buffer tank 16 and by contacting the fresh skimmed milk with the mixture of acidified milk and the resin transferred as described above.

Further, the decationised, acidified milk stored at 11 and the fresh skimmed milk stored at 1a or 1b may be contacted in a coagulation head 22. The pH of the mixture is adjusted to the isoelectric point of casein by regulating a valve 23 in conjunction with a pH meter 24. The coagulation of the casein is achieved by vapour injection into the coagulation head via a conduit 25. The flocculated casein and milk serum are recovered from the effluent discharge from the coagulation head 22 via a conduit 26.

The following Examples serve to illustrate an embodiment of the process according to the invention in the apparatus described above.

EXAMPLE 1

(1) Preparation of acidified, decationised milk stock

250 $cm^3$ of skimmed milk cooled to 2° C. and 90 $cm^3$ of cationic resin in the $H^+$ form commercially available under the name "Duolite C 26" (a sulfonated styrenedivinylbenzene copolymer, with macroporous structure) in the form of spheres 0.3 to 1.2 mm, are placed in a closed reactor. After 5 min. contact, with agitation, the pH of the milk (initial pH 6.7) is reduced to 2.5.

(2) Preparation of decationised, acidified milk

Skimmed milk at 10° C. is continuously introduced into the reactor at a rate of 2 l/h, by a pump. The acidified milk which is formed is drawn off at the same rate; 650 $cm^3$ of the skimmed milk are thus treated in addition to the initial 250 $cm^3$. The final temperature of the milk is 9° C.; the mean pH is 2.65 and the total operation time about 30 min.

| | Analysis | |
|---|---|---|
| Compostion | Starting milk | Decationised acidified milk |
| Dry extract (g/l) | 92.5 | 84.6 |
| Total nitrogenous material (g/l) | 34.7 | 32.1 |
| Casein (g/l) | 27.1 | 26.5 |
| Mineral material (g/l) | 7.9 | 3.35 |
| Calcium (g/l) | 1.15 | 0.25 |
| Sodium (g/l) | 0.45 | traces |
| Potassium (g/l) | 1.45 | traces |
| Phosphorus (g/l) | 1.05 | 0.96 |
| pH | 6.7 | 2.65 |

EXAMPLE 2

250 $cm^3$ acidified milk stock, at pH 2.65, obtained in Example 1, at 16° C., and 90 $cm^3$ regenerated cationic resin "Duolite C 26" in $H^+$ form are introduced into a closed reactor. The mixture is stirred for 1 min. The skimmed milk, at 20° C., is then continuously fed in over 29 min. at a rate of 2 l/h. The acidified milk which is formed is drawn off at the same rate as the skimmed milk being fed in. At the end of the reaction, 900 $cm^3$ of decationised, acidified milk are recovered, at a mean pH of 2.6 and a temperature of 21° C.

| | Analysis | |
|---|---|---|
| Composition | Starting milk | Decationised acidified milk |
| Dry extract (g/l) | 92.1 | 84.3 |
| Total nitrogenous material (g/l) | 34.3 | 31.6 |
| Casein (g/l) | 26.5 | 25.7 |
| Mineral material (g/l) | 7.9 | 3.25 |
| Calcium (g/l) | 1.20 | 0.25 |
| Sodium (g/l) | 0.45 | traces |
| Potassium (g/l) | 1.50 | traces |
| Phosphorus (g/l) | 1.02 | 1 |
| pH | 6.65 | 2.60 |

EXAMPLE 3

Semi-continuous preparation of decationised, acidified milk

250 $cm^3$ of acidified milk stock at pH 2.6, obtained as in Example 2, cooled to 10° C., and 90 $cm^3$ of cationic resin "Duolite C 26" in $H^+$ form are introduced into a closed reactor. After stirring for 1 min., fresh skimmed milk at 10° C. is continuously introduced at a rate of 1.9 to 2 l/h and the acidified milk which is formed is removed at the same rate. After treatment for 30 min., the cycle is stopped; the saturated resin is separated from its content of residual milk, washed and regenerated with aqueous hydrochloric acid. In a second cycle, the residual acidified milk is contacted with the regenerated cationic resin and fresh skimmed milk is introduced into the reactor; the acidified milk which is formed is removed at the same rate as that of the introduction of milk. After treatment for 30 min., the cycle is stopped, the resin is separated from the residual amount of milk and that resin is regenerated again.

After five successive treatment cycles each of 30 min., starting from skimmed milk whose temperature is between 8° and 10° C., 18 l of decationised, acidified milk are recovered, at a mean pH of 2.55.

| Composition | Analysis | |
|---|---|---|
| | Starting milk | Decationised acidified milk |
| Dry extract (g/l) | 92.8 | 84.8 |
| Total nitrogenous material (g/l) | 34.6 | 31.7 |
| Casein (g/l) | 26.8 | 25.9 |
| Mineral material (g/l) | 7.7 | 3.3 |
| Calcium (g/l) | 1.15 | 0.20 |
| Sodium (g/l) | 0.48 | traces |
| Potassium (g/l) | 1.50 | traces |
| Phosphorus (g/l) | 1.05 | 1.02 |
| pH | 6.7 | 2.55 |

The acidified milk which is produced is quite suitable for the acidification of skimmed milk, for the bringing the pH of the mixture of the two milks at the isoelectric point of casein, for the production of curd intended for the preparation of casein or cheese, without rennet.

What is claimed is:

1. Process for the preparation of decationised, acidified milk having a pH less than or equal to 3.8, having the same content of proteinaceous materials and lactose as ordinary milk, a very low content of mineral elements, less than 4 g/l, and a Ca/P ratio less than 0.5, the process comprising contacting ordinary milk with a cation-exchange resin in the acid form, at a temperature above 4° C., and in the presence of an excess of milk previously acidified to a pH equal to or less than 3.8, in which the rate of introduction of the ordinary milk is such that the mixture of acidified and ordinary milks in contact with the exchange resin is maintained at a pH equal to or less than 3.8.

2. Process for the preparation of decationised, acidified milk having a pH less than or equal to 3.8, having the same content of proteinaceous materials and lactose as ordinary milk, a very low content of mineral elements, less than 4 g/l, and a Ca/P ratio less than 0.5, the process comprising the steps of:
 (a) contacting ordinary milk with a cation-exchange resin in the acid form at a temperature of 0° to 4° C. for a time sufficient to reduce the pH of the milk to a value less than or equal to 3.8, followed by separation of the spent exchange resin from the acidified milk stock thus obtained ;
 (b) adding fresh cation-exchange resin in the acid form to the milk stock;
 (c) continuously introducing, and contacting, at a temperature above 4° C., ordinary milk with the exchange resin in the presence of the acidified milk stock; and
 (d) continuously drawing-off acidified milk in relation to its production, in which the rate of introduction of the ordinary milk and the rate of drawing-off of the acidified milk are regulated in a manner such that the mixture of acidified milk and ordinary milk in contact with the exchange resin is maintained at a pH equal to or less than 3.8.

3. A process according to claim 1, in which the ordinary milk is introduced at a temperature of 8° to 20° C.

4. A process according to claim 1, in which the mixture of acidified and ordinary milks is maintained at a pH between 2.2 and 2.8.

5. A process according to claim 1, in which the quantity of ordinary milk is between 5 and 15 times the volume of the exchange resin.

6. A process according to claim 2, in which, in step (a), the temperature of the milk is from 0° to 2° C.

7. A process according to claim 2, in which the pH of the acidified milk is between 2.2 and 2.8.

8. A process according to claim 1, in which the quantity of previously acidified milk is between 2 and 4 times the volume of the exchange resin.

9. A process according to claim 1, in which tne pH of the previously acidified milk or of the milk stock is between 2.2. and 2.8.

10. A process according to claim 2, in which the mean rate of introduction of the ordinary milk and of drawing-off of the acidified milk is 20 times the volume of the exchange resin per hour.

11. A process according to claim 2 in which the ordinary milk is introduced at a temperature of 8° to 20° C.

12. A process according to claim 2, in which the mixture of acidified and ordinary milks is maintained at a pH between 2.2 and 2.8.

13. A process according to claim 2, in which the quantity of ordinary milk is between 5 and 15 times the volume of the exchange resin.

14. A process according to claim 2, in which the quantity of previously acidified milk is between 2 and 4 times the volume of the exchange resin.

15. A process according to claim 2, in which the pH of the previously acidified milk or of the milk stock is between 2.2 and 2.8.

* * * * *